US012603214B2

(12) United States Patent
Kil et al.

(10) Patent No.: US 12,603,214 B2
(45) Date of Patent: Apr. 14, 2026

(54) COMMON MODE FILTER

(71) Applicant: AMOGREENTECH CO., LTD., Gimpo-si (KR)

(72) Inventors: Sang Il Kil, Gimpo-si (KR); Chun Gul Lee, Gimpo-si (KR); Seon Oh Kim, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 665 days.

(21) Appl. No.: 18/004,170

(22) PCT Filed: Jul. 26, 2021

(86) PCT No.: PCT/KR2021/009608
§ 371 (c)(1),
(2) Date: Jan. 3, 2023

(87) PCT Pub. No.: WO2022/025546
PCT Pub. Date: Feb. 3, 2022

(65) Prior Publication Data

US 2023/0326645 A1 Oct. 12, 2023

(30) Foreign Application Priority Data

Jul. 31, 2020 (KR) ........................ 10-2020-0096190

(51) Int. Cl.
*H01F 27/28* (2006.01)
*H01F 17/06* (2006.01)
(Continued)

(52) U.S. Cl.
CPC ............ *H01F 17/06* (2013.01); *H01F 27/06* (2013.01); *H01F 27/2895* (2013.01);
(Continued)

(58) Field of Classification Search
CPC ........................................................ H01F 17/06
(Continued)

(56) References Cited

U.S. PATENT DOCUMENTS 2,937,351 A * 5/1960 Craig .................... H01F 29/146 205/135
3,287,795 A * 11/1966 Chambers ............. H01F 27/027 264/272.17
(Continued)

FOREIGN PATENT DOCUMENTS

CN 102024548 A 4/2011
JP 1-112011 U 7/1989
(Continued)

OTHER PUBLICATIONS

Office Action for KR 10-2020-0096190 by Korean Intellectual Property Office dated May 1, 2023.
(Continued)

*Primary Examiner* — Ronald Hinson
(74) *Attorney, Agent, or Firm* — BROADVIEW IP LAW, PC

(57) ABSTRACT

A common mode filter is provided. A common mode filter according to an exemplary embodiment of the present invention comprises: a ring-shaped magnetic core made of a magnetic material and installed so as to be positioned in an arrangement hole which is formed through a circuit board in a predetermined area; a plurality of coils wound around an outer surface of the magnetic core; and a base member to which the magnetic core having the plurality of coils wound thereon is coupled, and having a plurality of connector members for electrically connecting the plurality of coils to the outside, wherein the base member is installed such that a portion thereof is caught on an edge side of the arrangement hole.

12 Claims, 7 Drawing Sheets

100

(51) Int. Cl.
*H01F 27/06* (2006.01)
*H01F 27/29* (2006.01)
*H01F 17/00* (2006.01)

(52) U.S. Cl.
CPC ..... *H01F 27/29* (2013.01); *H01F 2017/0093* (2013.01); *H01F 2027/065* (2013.01)

(58) Field of Classification Search
USPC .................. 336/65, 182, 192, 198, 200, 229
See application file for complete search history.

(56) References Cited

U.S. PATENT DOCUMENTS

| | | | | |
|---|---|---|---|---|
| 5,140,706 A * | 8/1992 | Maeda | H03D 7/1408 336/229 |
| 6,031,442 A * | 2/2000 | Nakazawa | H01F 27/292 336/229 |
| 7,446,637 B1 | 11/2008 | Liang et al. | |
| 8,156,634 B2 * | 4/2012 | Gallup | H01F 17/043 29/605 |
| 8,659,383 B2 * | 2/2014 | Cheng | H01F 27/292 336/200 |
| 2008/0075975 A1 | 3/2008 | Glaser et al. | |
| 2011/0084789 A1 * | 4/2011 | Park | H01F 27/06 336/65 |
| 2011/0193668 A1 * | 8/2011 | Park | H05K 1/182 336/65 |
| 2012/0002387 A1 * | 1/2012 | Park | H05B 41/02 361/679.01 |
| 2012/0169446 A1 * | 7/2012 | Tseng | H05K 1/182 336/192 |
| 2012/0169448 A1 * | 7/2012 | Tseng | H05K 1/182 336/208 |
| 2018/0366265 A1 | 12/2018 | Jang et al. | |
| 2019/0272984 A1 * | 9/2019 | Takeshita | H01J 49/0031 |
| 2024/0296982 A1 * | 9/2024 | Lee | H01F 17/062 |

FOREIGN PATENT DOCUMENTS

| | | |
|---|---|---|
| JP | 1-167010 U | 11/1989 |
| JP | 3-1512 U | 1/1991 |
| JP | 5-55515 U | 7/1993 |
| JP | 2001-332426 A | 11/2001 |
| JP | 2008-198740 A | 8/2008 |
| JP | 2009-272434 A | 11/2009 |
| JP | 2011-66217 A | 3/2011 |
| JP | 2019-54156 A | 4/2019 |
| KR | 10-2009-0040798 A | 4/2009 |
| KR | 10-1008198 B1 | 1/2011 |
| KR | 10-2011-0085855 A | 7/2011 |
| KR | 10-2019-0088771 A | 7/2019 |
| KR | 10-2019-0093310 A | 8/2019 |
| KR | 10-2020-0079853 A | 7/2020 |

OTHER PUBLICATIONS

International Search Report for PCT/KR2021/009608 by Korean Intellectual Property Office dated Nov. 19, 2021.
Office Action and Search Report for CN 202180049088.4 by China National Intellectual Property Administration dated Dec. 23, 2025.

* cited by examiner

110

COMMON MODE FILTER

CROSS-REFERENCE TO RELATED APPLICATIONS

This application is a National Phase Entry Application of PCT Application No. PCT/KR2021/009608 filed on Jul. 26, 2021, which claims priority to Korean Patent Application No. 10-2020-0096190 filed on Jul. 31, 2020, in Korean Intellectual Property Office, the entire contents of which are hereby incorporated by reference in its entirety.

TECHNICAL FIELD

The present invention relates to a common mode filter.

BACKGROUND ART

A common mode filter is one of electronic components installed on a circuit board. Such a common mode filter can be applied to various electronic devices such as communication devices and display devices, and it can be used to remove conductive noise from the electronic devices.

Recently, since miniaturization and thinning of various electronic devices are required, the common filter applied to an electronic device is also required to be miniaturized and thinned.

Such a common mode filter passes signals that are required for circuit operation and removes common mode noise.

In general, a common mode filter is composed of a plurality of coils each wound around a magnetic core formed in a ring shape. In this common mode filter, a separate bobbin or case may cover the magnetic core to electrically insulate the magnetic core and the coil and protect the magnetic core from the external environment, and the coil is wound around the magnetic core which is covered by the bobbin or case.

Further, in the common mode filter, a separate component such as a separator for electrical insulation between coils is disposed at the central side of the case.

That is, since the conventional common mode filter is accompanied by a separate case surrounding the magnetic core, there is a limitation in that the overall size is inevitably increased by the thickness of the case.

This acts as an obstacle to downsizing and thinning e common mode filter.

In addition, since the conventional common mode filter is laminated on one surface of a circuit board, when the common mode filter is installed on the circuit board, the total thickness in which the common mode filter is installed inevitably increases by the thickness of the common mode filter from the thickness of the circuit board.

While restricting efficient space utilization, this acts as an obstacle to thinning the overall thickness of an electronic device to which the common mode filter is applied.

DISCLOSURE

Technical Problem

The present invention has been devised in consideration of the above points, and an object of the present invention is to provide a common mode filter capable of implementing a thinning while securing insulation and durability.

In addition, another object of the present invention is to provide a common mode filter capable of reducing the total installation thickness when it is installed on a circuit board.

Technical Solution

In order to solve the above-described problems, the present invention provides a common mode filter which is installed in a circuit board including an arrangement hole penetratingly formed in a predetermined area to be positioned in the arrangement hole, including a ring-shaped magnetic core made of a magnetic material; a plurality of coils wound around an outer surface of the magnetic core; and a base member to which the magnetic core is coupled, and having a plurality of connector members for electrically connecting the plurality of coils wound around the magnetic core to the outside, wherein the base member is installed such that a portion thereof is caught on an edge side of the arrangement hole.

In addition, the plurality of connector members may be provided in the base member so as to serve both as terminals for electrically connecting the plurality of coils wound around the magnetic core to the outside and as fastening members for fastening the base member to the circuit board.

In addition, the base member may include a ring-shaped body in which a hollow portion is formed, a connecting member which is formed on the body to cross the hollow portion and a pair of coupling grooves which are formed by entering a certain depth from one surface of the connecting member such that a portion of the magnetic core can be inserted.

In addition, the plurality of coils may include a first coil and a second coil, wherein the first coil and the second coil may be wound around the magnetic core so as to be positioned on both left and right sides of the connecting member while surrounding an outer surface of the magnetic core, wherein in the magnetic core, a portion where the first coil and the second coil are not wound may be forcefully fitted into the pair of coupling grooves, respectively, and wherein a portion of the magnetic core where the first coil and the second coil are not wound may be a portion located between a portion where the first coil is wound and a portion where the second coil is wound.

In addition, the magnetic core may be coupled to the base member such that the center of thickness thereof coincides with the center of thickness of the connecting member in a state of being coupled to the base member through the pair of coupling grooves.

In one embodiment, the base member may further include at least two extension parts protruding outward from the body by a predetermined length and having one surface forming a stepped surface with one surface of the body, wherein one surface of the extension part forming the stepped surface with one surface of the body may include a first portion extending from the body and a second portion extending from the first portion such that a first stepped surface and a second stepped surface having different heights may be formed, respectively, and wherein the second stepped surface may be installed to be caught on an edge of the arrangement hole.

In this case, each of the plurality of connector members may include a first protrusion part fixed to the first portion and protruding a certain length from one surface of the first portion such that an end of the coil can be connected, a second protrusion part disposed outside the second portion so as to be spaced apart from the first protrusion part at a predetermined interval and inserted into a fastening hole penetratingly formed around an arrangement hole of the circuit board to fix the base member to the circuit board, and a connecting part interconnecting the ends of the first protrusion part and the second protrusion part.

In another embodiment, the base member may further include at least two extension parts protruding outward from the body by a predetermined length and having one surface forming a stepped surface with one surface of the body, and wherein one surface of the extension part forming the stepped surface with one surface of the body may be installed to be caught on an edge of the arrangement hole.

In this case, each of the plurality of connector members may include a pad portion which is provided to be exposed to the outside on one surface of an extension part forming a stepped surface with one surface of the body and fixed to one surface of the circuit board through the SMD method, and a coil connection portion which is provided on the other surface of the extension part such that a portion of the length thereof protrudes to the outside from an end of the extension part such that an end of the coil is connected thereto.

In addition, the body and the extension part may include a first arrangement groove which is formed to be drawn in at a predetermined depth on one surface to accommodate the thickness of the coil that is drawn out from the magnetic core and connected to the coil connection portion.

In addition, the extension part may include a second arrangement groove which is formed to be drawn in at a predetermined depth on one surface to accommodate the thickness of a portion exposed to the outside of the coil connection portion.

In addition, the magnetic core may be made of a metal ribbon of an amorphous alloy or a nanocrystalline alloy, and the magnetic core may include an insulating coating layer formed on an outer surface to a predetermined thickness.

In addition, the magnetic core may be a winding body in which the metal ribbon of an amorphous alloy or nanocrystalline alloy is wound in a ring shape.

In addition, the common mode filter may have a total thickness of 5 to 6 mm.

Advantageous Effects

According to the present invention, even if the case covering a magnetic core is omitted, the overall thickness can be reduced by ensuring insulation and durability, and there is an advantage that the overall thickness of an electronic device can be reduced by reducing the overall installation thickness when it is installed on a circuit board.

MODES OF THE INVENTION

Figure 1:
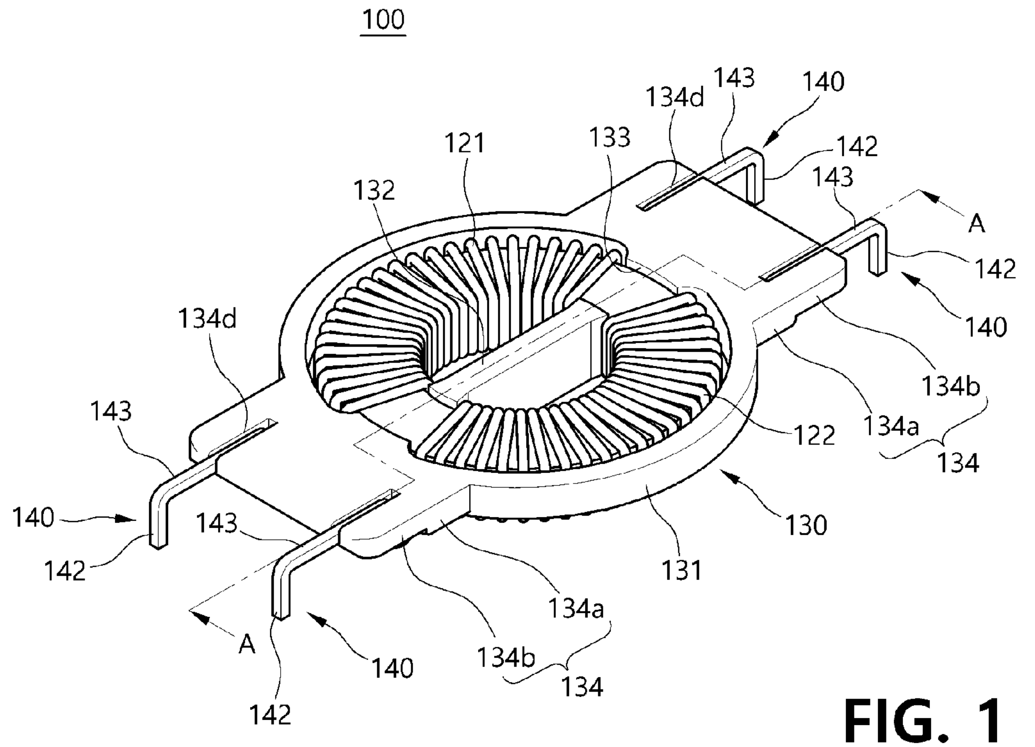
FIG. 1 is a view showing the common mode filter according to one embodiment of the present invention.

Hereinafter, with reference to the accompanying drawings, exemplary embodiments of the present invention will be described in detail so that those of ordinary skill in the art can easily practice the present invention. The present invention may be embodied in many different forms and is not limited to the exemplary embodiments described herein. In order to clearly describe the present invention in the drawings, parts that are irrelevant to the description are omitted, and the same reference numerals are assigned to the same or similar elements throughout the specification.

Figure 6:
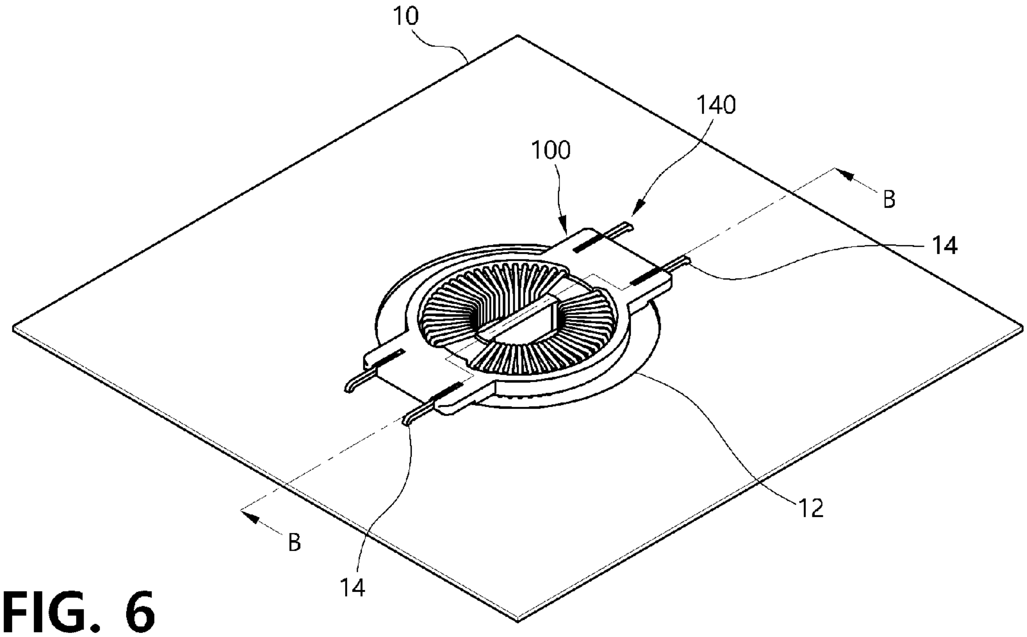
FIG. 6 is a view showing a state in which the common mode filter according to one embodiment of the present invention is installed on a circuit board.
Figure 12:
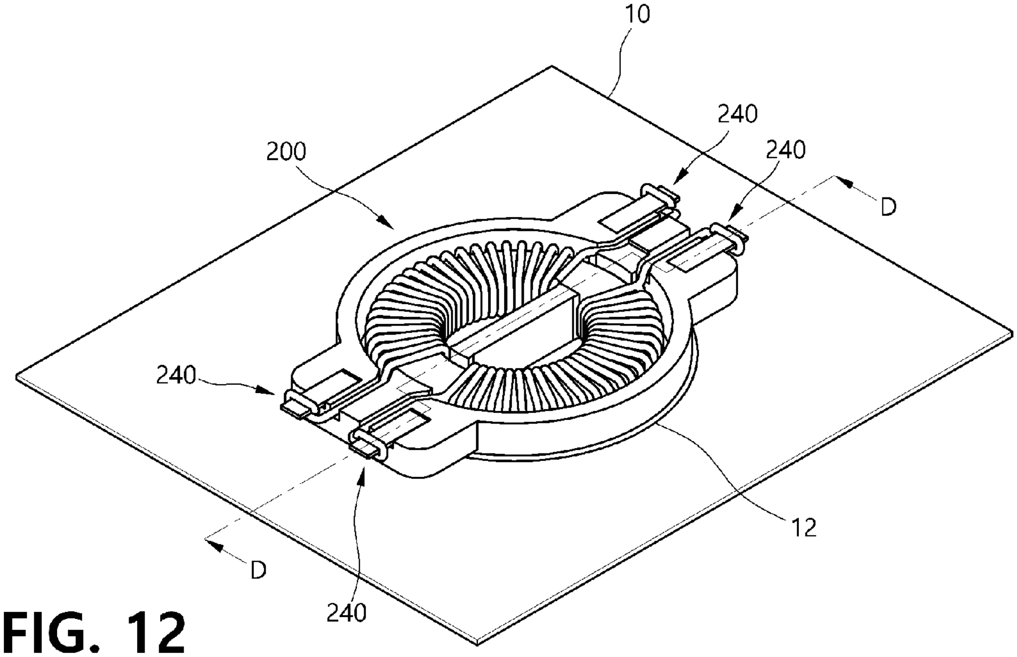
FIG. 12 is a view showing a state in which the common mode filter according to another embodiment of the present invention is installed on a circuit board.

The common mode filters 100, 200 according to one embodiment of the present invention may be installed on a circuit board 10 as illustrated in FIGS. 6 and 12.

In this case, a part of the common mode filters 100, 200 according to one embodiment of the present invention may be installed to be caught on the circuit board 10.

Figure 7:
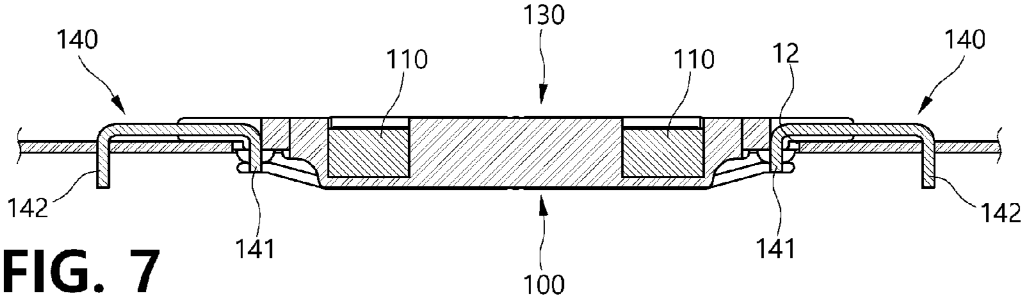
FIG. 7 is a cross-sectional view in the B-B direction of FIG. 6.
Figure 13:
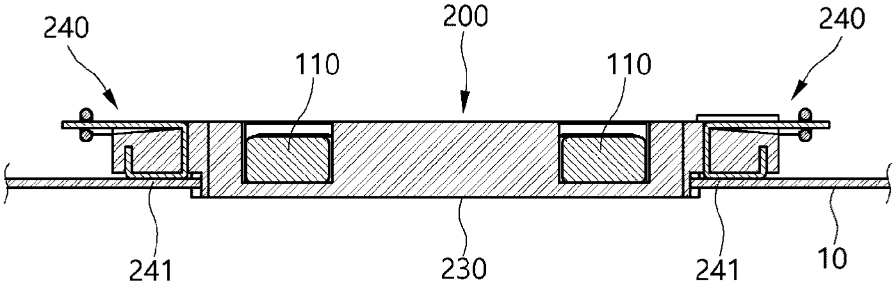
FIG. 13 is a cross-sectional view in the D-D direction of FIG. 12.

That is, as illustrated in FIGS. 7 and 13, the circuit board 10 may include an arrangement hole 12 penetratingly formed in a predetermined area, and the common mode filters 100, 200 may be installed on the circuit board 10 to be positioned in a region corresponding to the arrangement hole 12.

Accordingly, in the common mode filters 100, 200, a portion of the total thickness may be accommodated by the arrangement hole 12 and a portion thereof may be installed to be hooked to an edge side of the arrangement hole 12.

As a result, when the common mode filters 100, 200 according to one embodiment of the present invention are installed on the circuit board 10, a portion of the total thickness of the common mode filters 100, 200 is accommodated by the arrangement hole 12, and thus, the overall installation thickness installed on the circuit board 10 may be reduced.

To this end, the common mode filters 100, 200 according to one embodiment of the present invention include a magnetic core 110, a plurality of coils 121, 122 and base members 130, 230 as illustrated in FIGS. 1 to 4 and 8 to 11.

The magnetic core 110 may be formed in a ring shape, and may be made of a material having magnetism.

Figure 5:
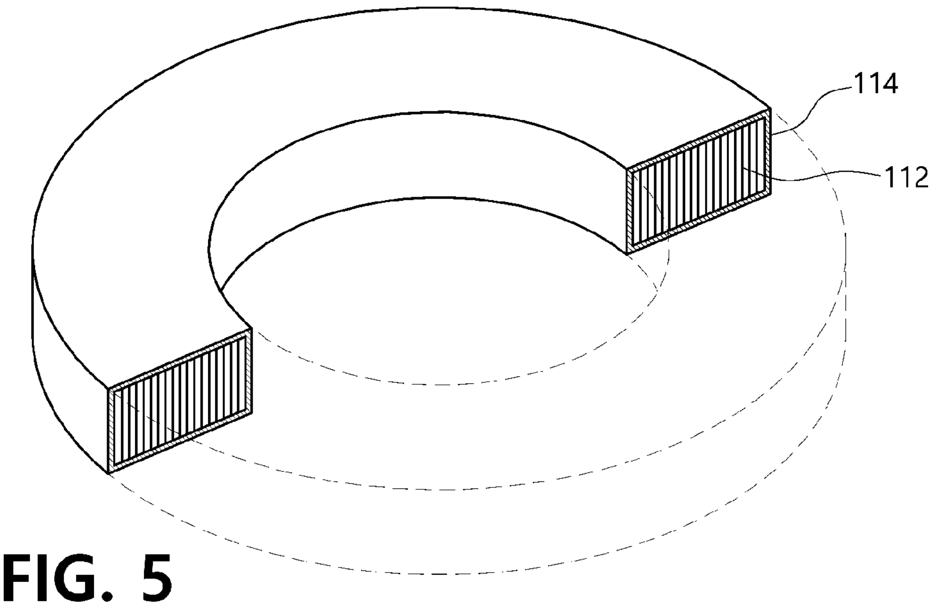
FIG. 5 is a partial cutaway view showing the detailed configuration of a magnetic core that can be applied to FIG. 1.

For example, the magnetic core 110 may be a ferrite core formed by sintering or rolling ferrite powder, but as illustrated in FIG. 5, the magnetic core 110 may be a winding body in which a plate-shaped metal ribbon 112 is wound a plurality of times in a ring shape.

Herein, the metal ribbon 112 may be a heat-treated Fe-based alloy ribbon, and the Fe-based alloy may be used without limitation as long as it is a known Fe-based alloy employed as a magnetic core.

As a non-limiting example, the Fe-based alloy may be a three-element alloy composed of iron (Fe), silicon (Si), boron (B) and other impurities, a four-element alloy composed of iron (Fe), boron (B), carbon (C), copper (Cu) and other impurities, a five-element alloy composed of iron (Fe), silicon (Si), boron (B), copper (Cu), niobium (Nb) and other impurities, or a five-element alloy composed of iron (Fe), boron (B), carbon (C), copper (Cu), niobium (Nb) and other impurities. In addition, the Fe-based alloy may include an amorphous structure or nanocrystalline grains.

In this case, as illustrated in FIG. 5, the magnetic core 110 may include an insulating coating layer 114 formed on an outer surface to a predetermined thickness. Such an insulating coating layer 114 may be formed by using a dipping or spraying method.

Accordingly, even if the magnetic core 110 is composed of a winding body in which the metal ribbon 112 is wound a plurality of times in a ring shape, the magnetic core 110 may be formed as a single mass through the insulating coating layer 114. In addition, although the coils 121, 122 are directly wound on the outer surface of the magnetic core 110, the coils 121, 122 and the magnetic core 110 may be electrically insulated from each other through the insulating coating layer 114.

In addition, even if the metal ribbon 112 constituting the magnetic core 110 becomes brittle after heat treatment, the magnetic core 110 may be protected from external force through the insulating coating layer 114, and thus, in the common mode filters 100, 200 of the present invention, a separate case or bobbin for covering the magnetic core 110 may be omitted.

Through this, the common mode filters 100, 200 according to one embodiment of the present invention may be implemented in a thin shape having a very thin thickness because the case or bobbin surrounding the magnetic core 110 may be omitted as compared to the related art.

For example, the common mode filters 100, 200 may have a very thin thickness with an overall thickness or an overall height of 5 to 6 mm. However, the total thickness of the present invention is not limited thereto, and it may be appropriately varied according to design conditions.

Herein, the insulating coating layer 114 may be formed of a coating composition including an organic compound, the organic compound may be an epoxy compound, and the coating composition may further include a curing agent capable of curing the epoxy compound.

However, the insulating coating layer 114 is not limited thereto, and as long as it has insulation and can increase durability, it may be employed without limitation.

The magnetic core 110 may be coupled to the base members 130, 230 in a state where the plurality of coils 121, 122 are wound along the outer surface.

For example, the plurality of coils 121, 122 may include a first coil 121 and a second coil 122, and the first coil 121 and the second coil 122 may be respectively wound around the magnetic core 110 so as to be symmetrically arranged without overlapping each other in the ring-shaped magnetic core 110.

In addition, the magnetic core 110 may be coupled to the base members 130, 230 through a portion in which the first coil 121 and the second coil 122 are not wound.

Moreover, the first coil 121 and the second coil 122 respectively wound around the magnetic core 110 may be electrically connected to a plurality of connector members 140, 240 provided in the base member 130, 230, respectively, and the plurality of connector members 140, 240 may be electrically connected to the circuit board 10.

Accordingly, the first coil 121 and the second coil 122 may receive power through the circuit board 10 and the plurality of connector members 140, 240.

That is, the base members 130, 230 may be coupled to the magnetic core 110 on which the first coil 121 and the second coil 122 are wound to fix the magnetic core 110, and may include a plurality of connector members 140, 240 for electrically connecting the first coil 121 and the second coil 122 to the circuit board 10.

Figure 3:
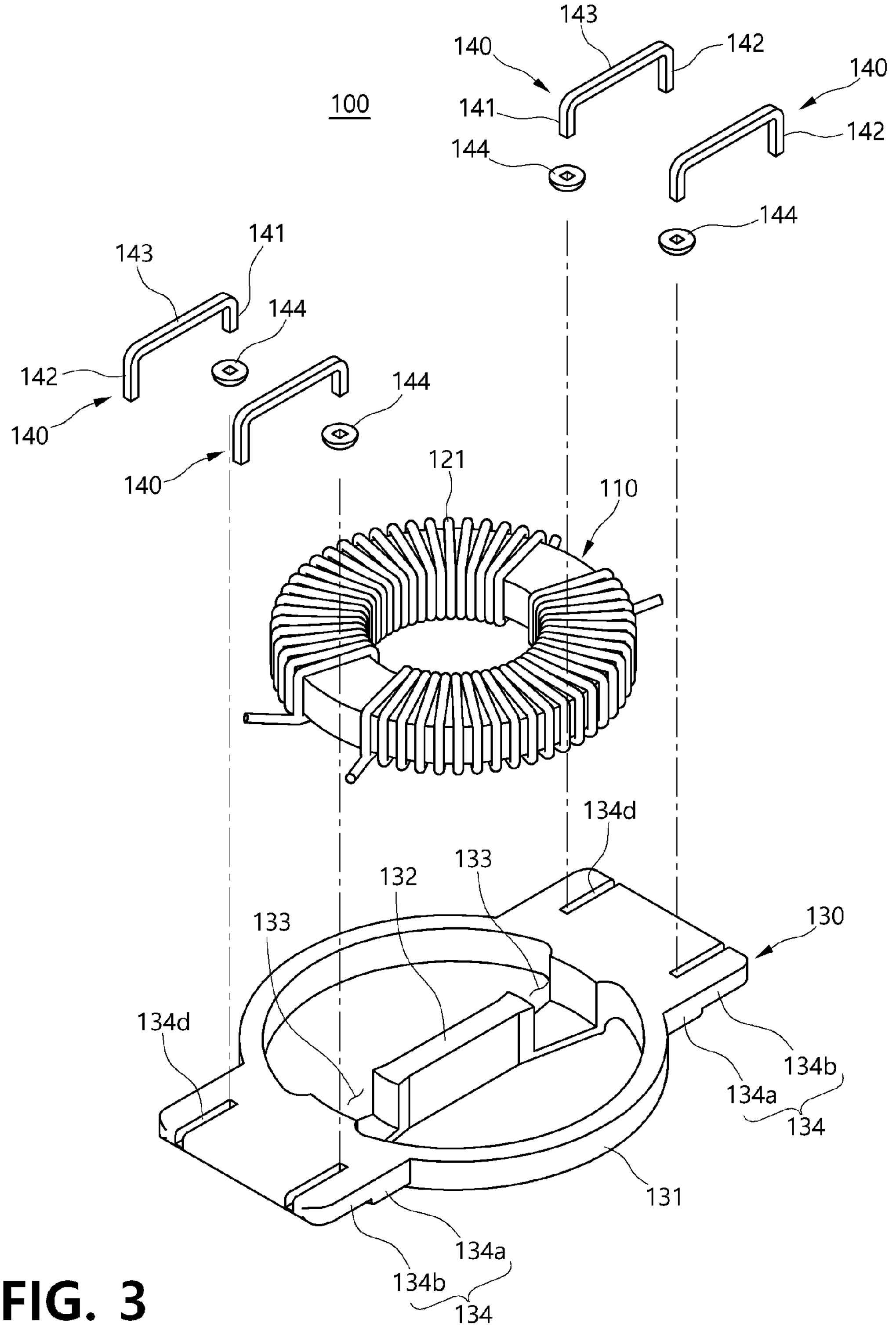
FIG. 3 is a separation view of FIG. 1.
Figure 10:
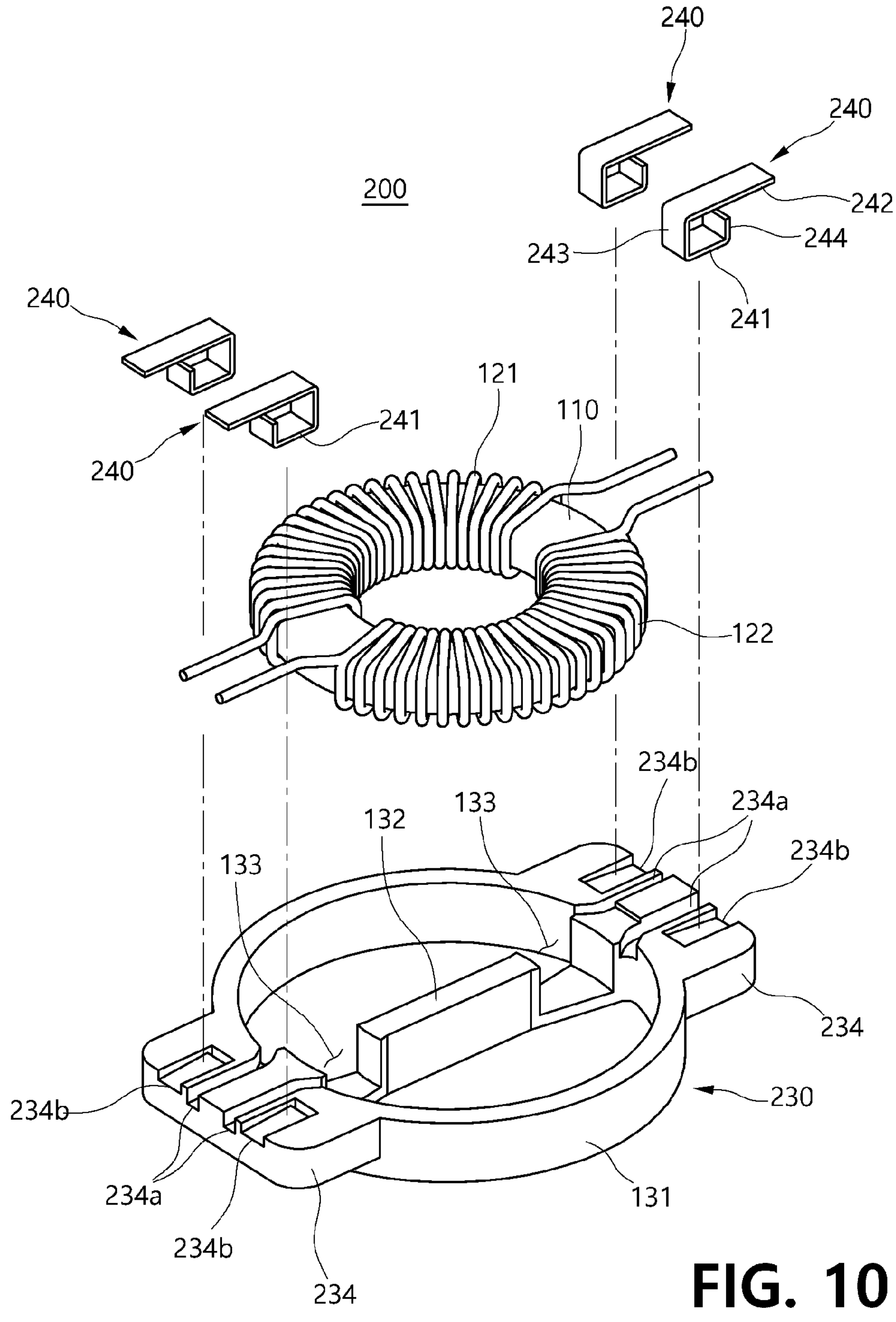
FIG. 10 is a separation view of FIG. 8.

To this end, as illustrated in FIGS. 3 and 10, the base members 130, 230 may include a ring-shaped body 131 in which a hollow portion is formed to accommodate the magnetic core 110, a connecting member 132 formed on the body 131 so as to cross the hollow portion and a pair of coupling grooves 133 that are formed to draw in from one surface of the connecting member 132 to a certain depth such that a portion of the magnetic core 110 may be inserted.

In this case, a portion of the magnetic core 110 in which the first coil 121 and the second coil 122 is not wound may be inserted into the pair of coupling grooves 133.

That is, the first coil 121 and the second coil 122 may be respectively wound around the magnetic core 110 so as to be positioned on the left and right sides of the connecting member 132 while surrounding the outer surface of the magnetic core 110.

Herein, the portion of the magnetic core 110 on which the first coil 121 and the second coil 122 are not wound may be a portion located between a portion on which the first coil 121 is wound and a portion on which the second coil 122 is wound.

Accordingly, the portion of the magnetic core 110 located between the portion on which the first coil 121 is wound and the portion on which the second coil 122 is wound and on which the first coil 121 and the second coil 122 are not wound may be respectively inserted into the pair of coupling grooves 133.

For this reason, when the magnetic core 110 on which the first coil 121 and the second coil 122 are wound is coupled to the base members 130, 230, the first coil 121 and the second coil 122. may be disposed to be located on both left and right sides of the connecting member 132. In this case, the connecting member 132 may serve as a separator to physically insulate the first coil 121 and the second coil 122 from each other.

In this case, a portion of the connecting member 132 connected to the body 131 while the coupling groove 133 is formed may be formed to have a larger area from the middle portion of the length of the connecting member 132 toward the body 131.

Accordingly, the portion of the magnetic core 110 located between the portion on which the first coil 121 is wound and the portion on which the second coil 122 is wound and on which the first coil 121 and the second coil 122 are not wound may have a larger area from the inner side to the outer side.

For this reason, the end of the first coil 121 and the end of the second coil 122 wound around the magnetic core 110 may secure a safe distance for electrical insulation.

Herein, the portion of the magnetic core 110 inserted into the pair of coupling grooves 133 may be fixed to the coupling groove 133 through a separate adhesive, or it may be fixed to the coupling groove 133 through force fitting.

Figure 4:
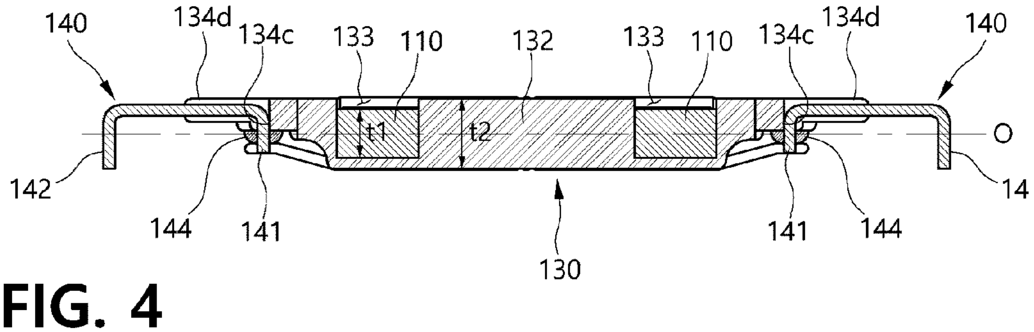
FIG. 4 is a cross-sectional view in the A-A direction of FIG. 1.
Figure 11:
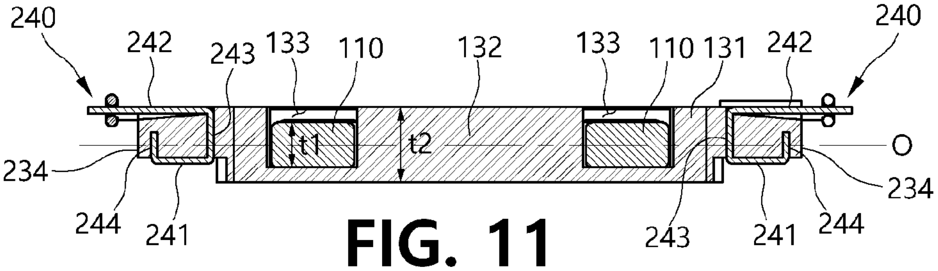
FIG. 11 is a cross-sectional view in the C-C direction of FIG. 8.

In this case, the connecting member 132 may be formed to have a thicker thickness t2 than a thickness t1 of the magnetic core 110 as illustrated in FIGS. 4 and 11, and the depth of the coupling groove 133 may have a larger size than the thickness t1 of the magnetic core 110.

Accordingly, when a part of the magnetic core 110 is inserted into the coupling groove 133, the portion of the magnetic core 110 inserted into the coupling groove 133 may be completely inserted into the coupling groove 133. Further, in a state where the magnetic core 110 is coupled to the base members 130, 230 through the pair of coupling grooves 133, the center of thickness of the magnetic core 110 and the center of thickness of the connecting member 132 may be arranged to be positioned on a straight line O.

For this reason, in the common mode filters 100, 200 according to one embodiment of the present invention, the total thickness of the magnetic core 110 may be completely accommodated in the coupling grooves 133 formed in the base members 130, 230, thereby minimizing the total thickness.

Meanwhile, as described above, the common mode filters 100, 200 according to one embodiment of the present invention may be installed to be partially caught on an edge of the arrangement hole 12 formed in the circuit board 10.

That is, in the common mode filters 100, 200 according to one embodiment of the present invention, as illustrated in FIGS. 6, 7, 12 and 13, a part of the base members 130, 230 may be installed to be caught on an edge side of the arrangement hole 12.

Accordingly, the magnetic core 110 may be disposed so as not to be laminated on one surface of the circuit board 10.

In this case, the plurality of connector members 140, 240 provided on the base members 130, 230 may serve both as terminals for electrically connecting the plurality of coils 121, 122 wound around the magnetic core 110 to the circuit board 10, and as fastening members for fastening the base members 130, 230 to the circuit board 10.

To this end, the base members 130, 230 may include at least two extension parts 134, 234 that protrude a predetermined length outward from the body 131 and have one surface forming a stepped surface with one surface of the body 131, and the at least two extension parts 134, 234 may be fixed to the circuit board 10 through the plurality of connector members 140, 240.

For example, as shown in FIGS. 1 to 4, the extension part 134 forming a stepped surface with one surface of the body 131 may include a first portion 134*a* extending from the body 131 and a second portion 134*b* extending from the first portion 134*a*, and the first portion 134*a* may be formed to have a thinner thickness than the second portion 134*b*.

Figure 2:
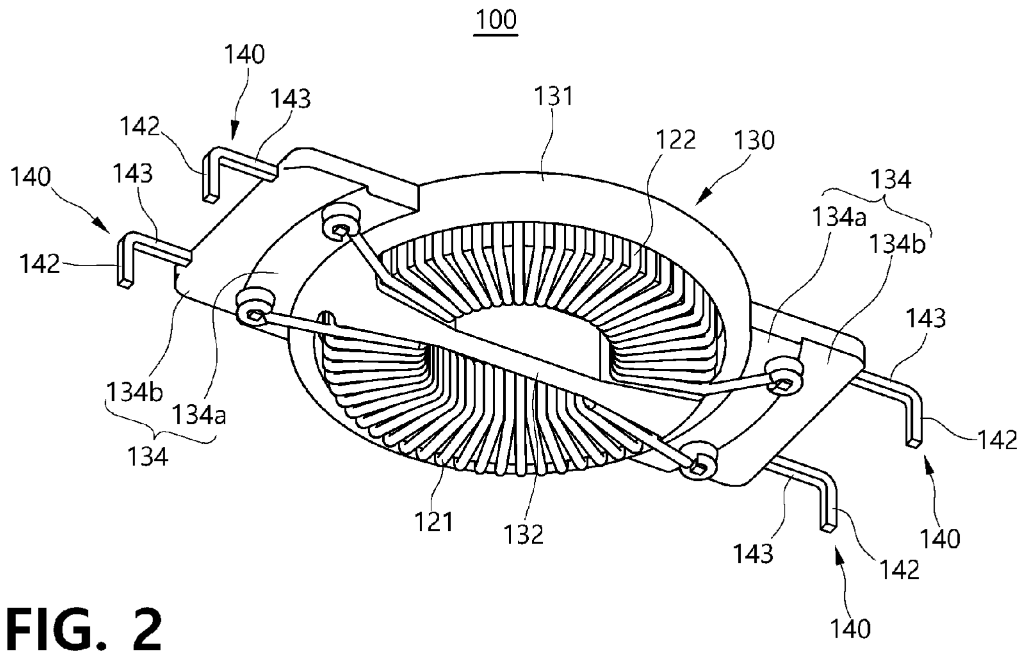
FIG. 2 is a view of FIG. 1 viewed from the bottom.

Accordingly, as illustrated in FIG. 2, one surface of the first portion 134*a* and one surface of the second portion 134*b* may form stepped surfaces having different heights. That is, one surface of the first portion 134*a* may form a first stepped surface formed to be stepped with one surface of the body 131, and one surface of the second portion 134*b* may form a second stepped surface formed to be stepped with the first stepped surface.

In addition, as illustrated in FIG. 3, the connector member 140 may include a first protrusion part 141 which is fixed to the first portion 134*a*, a second protrusion part 142 which is disposed on an outer side of the second portion 134*b* to be spaced apart from the first protrusion part 141 by a predetermined distance, and a connecting part 143 for interconnecting the ends of the first protrusion part 141 and the second protrusion part 142.

In this case, as illustrated in FIG. 4, the first protrusion part 141 may be fixed to the first portion 134*a* so as to protrude a predetermined length from one surface of the first portion 134*a*, and the second protrusion part 142 may be spaced apart from the first protrusion part 141 and the extension part 134 by a predetermined distance through the connecting part 143. In addition, the first protrusion part 141 and the second protrusion part 142 may be extended by a predetermined length from the connecting part 143 toward each other in the same direction.

Through this, the ends of the coils 121, 122 wound around the magnetic core 110 may be connected to the first protrusion part 141 protruding a predetermined length from one surface of the first portion 134*a*, and the second protrusion part 142 may be inserted into a fastening hole 14 formed through the circuit board 10.

As a non-limiting example, based on the drawings illustrated in FIGS. 1 to 4, the lower surface of the extension part 134 may be formed as a stepped surface through the lower surface of the first portion 134*a* and the lower surface of the second portion 134*b*, and the lower surface of the first portion 134*a* may be a first stepped surface, and the lower surface of the second portion 134*b* may be a second stepped surface.

In this case, the second stepped surface, which is the lower surface of the second portion 134*b*, may come into contact with one surface of the circuit board 10, and the base member 130 may be installed to be caught on an edge side of the arrangement hole 12 through the second stepped surface.

Further, in the connector member 140, the first protrusion part 141 may be fixed to the first portion 134*a* such that an end thereof protrudes downward from the lower surface of the first portion 134*a* by a predetermined length, and the second protrusion part 142 may protrude downward from the outer side of the second portion 134*b*.

In this case, as illustrated in FIGS. 1 and 3, the extension part 134 may include an accommodating groove 134*b* which is provided to accommodate the thickness of the connecting part 143 and is formed on an upper surface thereof to be drawn in by a certain depth to prevent the connecting part 143 from protruding outward from the upper surface of the extension part 134.

Moreover, in the connector member 140, the first protrusion part 141 may be integrally formed with the extension part 134 through insert molding, but it may be fixed through a separate member after being inserted into the extension part 134.

That is, as illustrated in FIG. 4, the first portion 134*a* may include a through hole 134*c* which is penetratingly formed in the height direction such that the first protrusion part 141 may be inserted, and the first protrusion part 141 may be fixed through a separate fixing member 144 on the lower surface of the first portion 134*a* after passing through the through hole 134*c*.

Moreover, the circuit board 10 may include a plurality of fastening holes 14 which are penetratingly formed around the arrangement hole 12.

Accordingly, when the common mode filter 100 according to one embodiment of the present invention is disposed on the side of the arrangement hole 12 of the circuit board 10, the base member 130 may be installed to be caught on an edge side of the arrangement hole 12 through the second stepped surface. In addition, the second protrusion part 142 of the connector member 140 may be inserted into the fastening hole 14 formed in the circuit board 10, and the second protrusion part 142 inserted into the fastening hole 14 may be fixed to the circuit board 10 through soldering.

For this reason, the common mode filter 100 according to one embodiment of the present invention may be installed to be caught on the circuit board 10 through the extension part 134 of the base member 130, and the coils 121, 122 that are wound around the magnetic core 110 may be electrically connected to the circuit board 10 through the connector member 140.

Moreover, the connector member 140 may serve both as a terminal electrically connected to the circuit board 10 and as a fastening member for fixing the base member 130 to the circuit board 10.

As another example, as illustrated in FIGS. 8 to 11, the base member 230 may include an extension part 234 which protrudes from the body by a certain length to form a stepped surface with one surface of the body, and a portion of the connector member 240 may be provided to be exposed to the outside on one surface of the extension part 234 forming the stepped surface.

Figure 8:
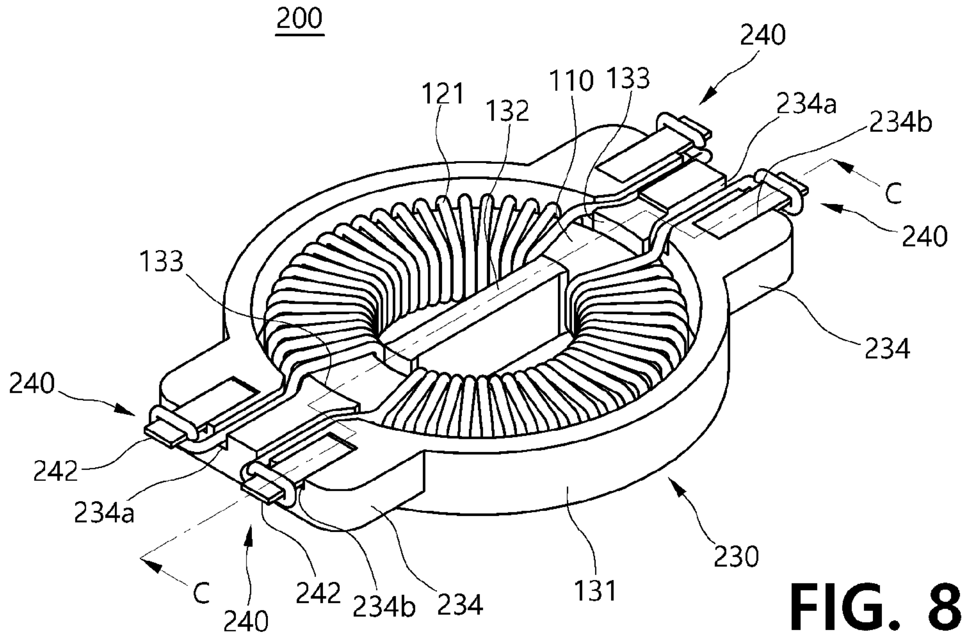
FIG. 8 is a view showing the common mode filter according to another embodiment of the present invention.
Figure 9:
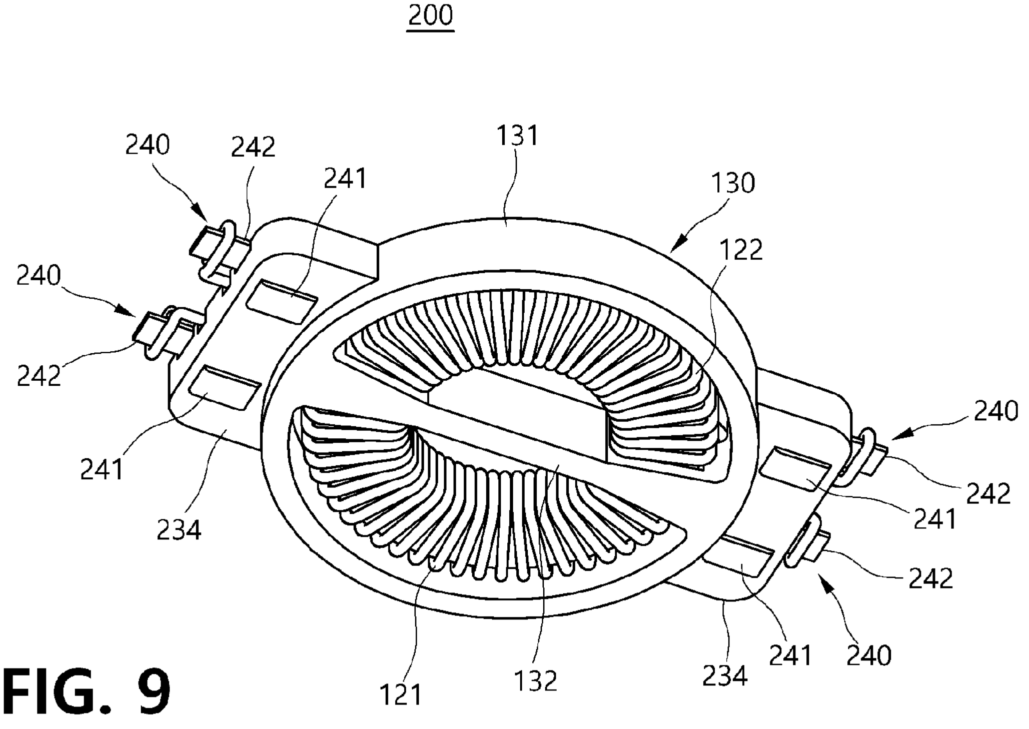
FIG. 9 is a view of FIG. 8 viewed from the bottom.

That is, as illustrated in FIGS. 8 and 9, the connector member 240 may include a pad portion 241 which is formed to be exposed to the outside on one surface of the extension part 234 forming the step surface, and a coil connection portion 242 provided such that a portion of the length protrudes outward from the end of the extension part 234 on the other surface of the extension part 234.

In this case, as illustrated in FIGS. 10 and 11, the pad portion 241 may be connected to the coil connection portion 242 through a first embedded part 243 embedded in the extension part 234, and the connector member 240 may further include a second embedded part 244 which is bent from an end of the pad portion 241 and embedded in the extension part 234.

Through this, the ends of the coils 121, 122 wound around the magnetic core 110 may be connected to the coil connection portion 242 protruding outward from the end of the extension part 234, and the pad portion 241 may be in direct contact with one surface of the circuit board 10.

As a non-limiting example, based on the drawings illustrated in FIGS. 8 to 11, the lower surface of the extension part 234 may be formed as a stepped surface with the lower surface of the body 131, and the connector member 240 may be integrated with the extension part 234 through insert molding.

That is, the connector member 240 may be provided in a shape in which a plate-shaped conductive member having a predetermined area is bent a plurality of times, and a portion of the entire length may be exposed from the lower surface of the extension part 234 to the outside, and a portion of the remaining length may be integrated with the extension part 234 to be exposed to the outside from the upper surface of the extension part 234.

Accordingly, in the connector member 240, the portion exposed to the outside from the lower surface of the extension part 234 may form the pad portion 241 described above, and the portion that is exposed to the outside from the upper surface of the extension part 234 may form the above-described coil connection portion 242, and the portion embedded in the extension part 234 may form the above-described first embedded part 243 and second embedded part 244.

In this case, the pad portion 241 formed on the stepped surface, which is the lower surface of the extension part 234, may be in direct contact with one surface of the circuit board 10. Accordingly, the base member 230 may be installed to be caught on the edge of the arrangement hole 12 through the lower surface of the extension part 234, and the pad portion 241 provided on the stepped surface, which is the lower surface of the extension part 234, may be fixed to the circuit board 10 through the SMD method.

Herein, the body 131 and the extension part 234 may include a first arrangement groove 234*a* which is drawn out from the magnetic core 110 and is formed to be drawn in to a certain depth on the upper surface to accommodate the thickness of the coils 121, 122 connected to the coil connection portion 242. In addition, the extension part 234 may include a second arrangement groove 234*b* which is formed to be drawn in to a certain depth on the upper surface so as to accommodate the thickness of the coil connection portion 242.

The first arrangement groove 234*a* and the second arrangement groove 234*b* may respectively accommodate the thickness of the coils 121, 122 and the thickness of the coil connection portion 242 such that the coils 121, 122 and the coil connection portion 242 may be prevented from protruding to the outside from the upper surface of the extension part 234.

Accordingly, as illustrated in FIGS. 12 and 13, when the common mode filter 200 according to one embodiment of the present invention is disposed in the arrangement hole 12 of the circuit board 10, the base member 230 may be installed to be caught on the edge of the arrangement hole 12 through a stepped surface formed on one surface of the extension part 234, and the pad portion 241 of the connector member 240 formed on the stepped surface may be fixed to one surface of the circuit board 10 through the SMD method.

For this reason, the common mode filter 200 according to one embodiment of the present invention may be installed to be caught on the circuit board 10 through the extension part 234 of the base member 230, and the coils 121, 122 wound around the magnetic core 110 may be electrically connected to the circuit board 10 through the connector member 240.

Accordingly, the connector member 240 may serve as a terminal electrically connected to the circuit board 10 and as a fastening member for fixing the base member 230 to the circuit board 10.

Although one embodiment of the present invention has been described above, the spirit of the present invention is not limited to the exemplary embodiments presented herein, and a person skilled in the art who understands the spirit of the present invention may easily suggest other exemplary embodiments by modifying, changing, deleting or adding components within the scope of the same spirit, but it can be said that this also falls within the spirit of the present invention.

The invention claimed is:

1. A common mode filter which is installed in a circuit board comprising an arrangement hole penetratingly formed in a predetermined area to be positioned in the arrangement hole, comprising: a ring-shaped magnetic core made of a magnetic material; a plurality of coils wound around an outer surface of the magnetic core; and a base member to which the magnetic core is coupled, and having a plurality of connector members for electrically connecting the plurality of coils wound around the magnetic core to the outside, wherein the base member is installed such that a portion thereof is caught on an edge side of the arrangement hole, wherein the base member includes a ring-shaped body in which a hollow portion is formed, a connecting member which is formed on the body to cross the hollow portion and a pair of coupling grooves which are formed by entering a certain depth from one surface of the connecting member such that a portion of the magnetic core can be inserted, wherein the base member further includes at least two extension parts protruding outward from the body by a predetermined length and having one surface forming a stepped surface with one surface of the body, wherein one surface of the extension part forming the stepped surface with one surface of the body includes a first portion extending from the body and a second portion extending from the first portion such that a first stepped surface and a second stepped surface having different heights may be formed, respectively, and wherein the second stepped surface is installed to be caught on an edge of the arrangement hole.

2. The common mode filter of claim 1, wherein the plurality of connector members are provided in the base member so as to serve both as terminals for electrically connecting the plurality of coils wound around the magnetic core to the outside and as fastening members for fastening the base member to the circuit board.

3. The common mode filter of claim 1, wherein the plurality of coils include a first coil and a second coil, wherein the first coil and the second coil are wound around the magnetic core so as to be positioned on both left and right sides of the connecting member while surrounding an outer surface of the magnetic core, wherein in the magnetic core, a portion where the first coil and the second coil are not wound is forcefully fitted into the pair of coupling grooves, respectively, and wherein a portion of the magnetic core where the first coil and the second coil are not wound is a portion located between a portion where the first coil is wound and a portion where the second coil is wound.

4. The common mode filter of claim 1, wherein the magnetic core is coupled to the base member such that the center of thickness thereof coincides with the center of thickness of the connecting member in a state of being coupled to the base member through the pair of coupling grooves.

5. The common mode filter of claim 1, wherein each of the plurality of connector members comprises a first protrusion part fixed to the first portion and protruding a certain length from one surface of the first portion such that an end of the coil can be connected, a second protrusion part disposed outside the second portion so as to be spaced apart from the first protrusion part at a predetermined interval and inserted into a fastening hole penetratingly formed around an arrangement hole of the circuit board to fix the base member to the circuit board, and a connecting part interconnecting the ends of the first protrusion part and the second protrusion part.

6. The common mode filter of claim 1, wherein the base member further includes at least two extension parts protruding outward from the body by a predetermined length and having one surface forming a stepped surface with one surface of the body, and wherein one surface of the extension part forming a stepped surface with one surface of the body is installed to be caught on an edge of the arrangement hole.

7. The common mode filter of claim 6, wherein each of the plurality of connector members includes a pad portion which is provided to be exposed to the outside on one surface of an extension part forming a stepped surface with one surface of the body and fixed to one surface of the circuit board through the SMD method, and a coil connection portion which is provided on the other surface of the extension part such that a portion of the length thereof protrudes to the outside from an end of the extension part such that an end of the coil is connected thereto.

8. The common mode filter of claim 7, wherein the body and the extension part include a first arrangement groove which is formed to be drawn in at a predetermined depth on one surface to accommodate the thickness of the coil that is drawn out from the magnetic core and connected to the coil connection portion.

9. The common mode filter of claim 7, wherein the extension part includes a second arrangement groove which is formed to be drawn in at a predetermined depth on one surface to accommodate the thickness of a portion exposed to the outside of the coil connection portion.

10. The common mode filter of claim 1, wherein the magnetic core is made of a metal ribbon of an amorphous alloy or a nanocrystalline alloy, and the magnetic core includes an insulating coating layer formed on an outer surface to a predetermined thickness.

11. The common mode filter of claim 10, wherein the magnetic core is a winding body in which the metal ribbon of an amorphous alloy or nanocrystalline alloy is wound in a ring shape.

12. The common mode filter of claim 1, wherein the common mode filter has a total thickness of 5 to 6 mm.

* * * * *